(12) United States Patent
Donarummo

(10) Patent No.: US 7,788,841 B1
(45) Date of Patent: Sep. 7, 2010

(54) POP LURE

(75) Inventor: Anthony Donarummo, East Northport, NY (US)

(73) Assignee: Anthony C. Donarummo, East Northport, NY (US)

( * ) Notice: Subject to any disclaimer, the term of this patent is extended or adjusted under 35 U.S.C. 154(b) by 0 days.

(21) Appl. No.: 11/605,000

(22) Filed: Nov. 28, 2006

(51) Int. Cl.
*A01K 85/00* (2006.01)

(52) U.S. Cl. .................... 43/42.06; 43/42.02

(58) Field of Classification Search ............ 43/42.06, 43/42.02, 44.99
See application file for complete search history.

(56) References Cited

U.S. PATENT DOCUMENTS

| | | | | |
|---|---|---|---|---|
| 2,532,879 A | * | 12/1950 | Baker | 43/42.06 |
| 2,703,945 A | * | 3/1955 | Johnson | 43/42.06 |
| 2,794,287 A | * | 6/1957 | Mancuis, Jr. | 43/42.02 |
| 2,797,517 A | * | 7/1957 | Eriksen | 43/42.06 |
| 2,968,886 A | * | 1/1961 | Cotroumpas | 43/42.06 |
| 3,037,315 A | * | 6/1962 | Klawitter | 43/42.02 |
| 3,044,207 A | | 7/1962 | Dorsett | |
| 3,309,811 A | * | 3/1967 | Wimer | 43/42.06 |
| 4,267,658 A | | 5/1981 | Brown et al. | |
| 4,603,502 A | | 8/1986 | MacDonald | |
| 4,676,020 A | * | 6/1987 | Taylor et al. | 43/42.02 |
| 4,888,907 A | | 12/1989 | Gibbs | |
| 5,155,947 A | | 10/1992 | Rivard | |
| 6,092,327 A | * | 7/2000 | Nymann | 43/44.99 |
| 2003/0126785 A1 | * | 7/2003 | Poinski | 43/42.06 |

* cited by examiner

Primary Examiner—Christopher P Ellis

(57) ABSTRACT

A device and method for attracting a fish using a fish attractant. A first compartment of a lure receives a fish attractant. A passageway between the first and a second compartment is opened, allowing the fish attractant to flow from the first compartment to the second compartment. The fish attractant is released from the second compartment and into the body of water through a release aperture.

22 Claims, 6 Drawing Sheets

POP LURE

FIELD OF THE INVENTION

The present invention relates to fishing lures.

BACKGROUND OF THE INVENTION

Presently the general concept of holding a liquid attractant in a fishing lure exists in the prior art.

One patent disclosing a fishing lure holding a liquid attractant is U.S. Pat. No. 4,267,658 issued to Brown et al., which discloses a fishing lure having a first compartment formed by a bellows holding a liquid attractant. A second compartment surrounds the bellows and has a water inlet and outlet. A rod extends through the bellows and body of the lure and is attached to the fishing line. Movement of the rod collapses the bellow to allow liquid substance out of the bellows which is perforated with small holes. Once into the second compartment, water flowing through the compartment carries the liquid substance out of the lure. However, unlike the present invention, the Brown device is unable to sufficiently control the dispensing of an oil attractant.

Another US patent disclosing a fishing lure holding a liquid attractant is U.S. Pat. No. 5,155,947 issued to Rivard. Rivard discloses a scented fishing lure having a large compartment holding a fish attractant. A baffle extends up into the compartment. However, unlike the present invention, the Rivard device is unable to sufficiently control the dispensing of an oil attractant.

While these devices may be suitable for the purposes for which they were designed, they would not be suitable for the purposes of the present invention, as hereinafter described.

SUMMARY OF THE INVENTION

It is an object to provide a pop fishing lure.

Another object is to provide a pop fishing lure providing for the attachment of at least one hook.

Yet another object is to provide a pop fishing lure having a container wherein a fish attractant is retained in a first compartment of the container and selectively moved to a second compartment of the container.

Still another object is to provide a pop fishing lure having a plurality of apertures for releasing the oil from the second compartment into the water.

Another object is to provide a pop fishing lure wherein the first and second compartments are selectively separated by a spring loaded plug.

Yet another object is to provide a pop fishing lure wherein the spring loaded plug is selectively moved by the movement of a rod allowing contents of the first compartment to flow on top of the plug into the second compartment and out of the housing.

In accordance with this disclosure there is provided device for attracting fish of the type having secured thereto a fishing line and in which the device employs a fish attractant. The device has a housing having at least one volume therein for receiving the attractant. It also has means within the housing for controllably releasing the attractant into the water.

In another aspect of this disclosure there provided a method for attracting a fish comprising the activities of: filling a first compartment of a lure with a fish attractant; connecting a fishing rod and reel with a line to the lure; casting the lure into a body of water; applying a force to the rod; opening a passageway between the first compartment and a second compartment; allowing the fish attractant to flow from the first compartment to the second compartment; and releasing the attractant from the second compartment and into the body of water through at least one release aperture.

BRIEF DESCRIPTION OF THE DRAWING FIGURES

In order that the device may be more fully understood, it will now be described, by way of example, with reference to the accompanying drawing in which.

DETAILED DESCRIPTION OF THE INVENTION

Figure 1:
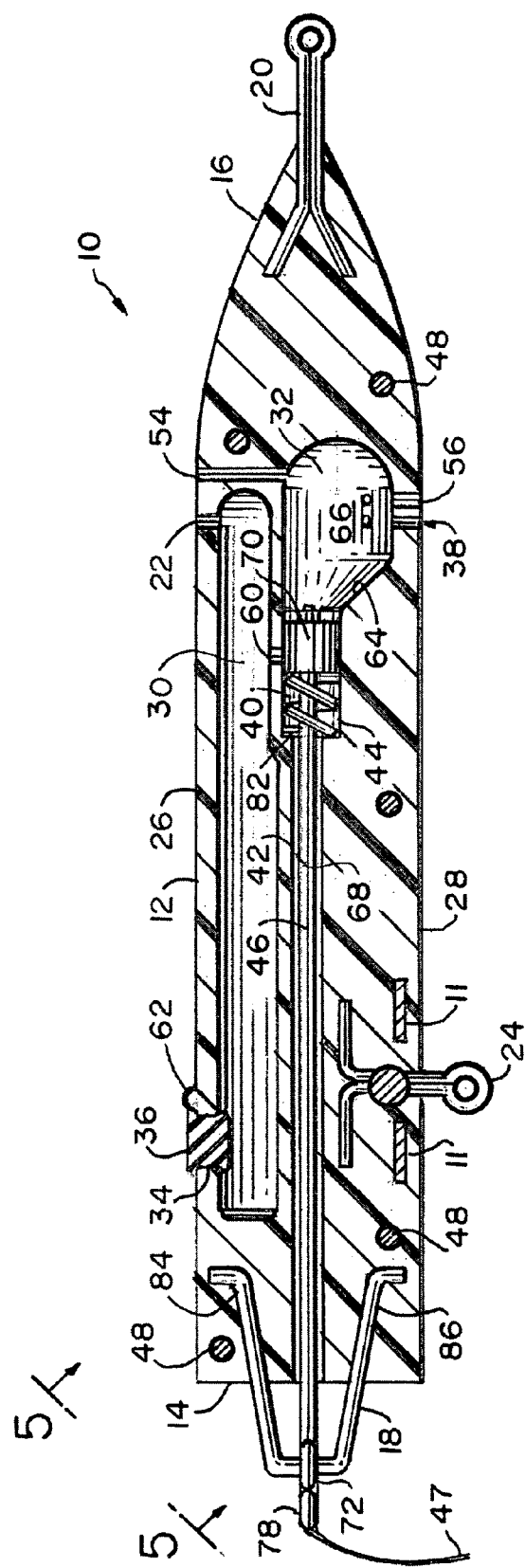
FIG. 1 is a side cross-sectional view of the pop fishing lure.

The following discussion describes in detail the disclosed device. This discussion should not be construed, however, as limiting to the particular embodiment. Practitioners skilled in the art will recognize numerous other embodiments as well.

Turning now to the drawings, in which similar reference characters denote similar elements throughout the several views, FIGS. 1 through 8 illustrate a pop fishing lure which is indicated generally by the reference numeral 10. While the fishing lure is described having a bullet shape throughout, it is to be understood that the principles disclosed herein may apply to fishing lures having any geometric shape, such as a cylinder, cube, or the like.

The pop fishing lure 10 (FIGS. 1 and 2) may include a housing 12 which may have a forward end 14 and a rear end 16 located on an opposing side thereof. The housing 12 may be formed from two parts, held together by a plurality of screws 48 or adhesive. Alternatively, the housing 12 may be formed from a single part.

The forward end 14 may include a forward pin 18 extending therefrom. The rear end 16 may be tapered and include a rear pin 20 extending therefrom for attaching a first hook (not shown) for use in catching a fish. The housing 12 further may have a top side 26 and a bottom side 28. The bottom side 28 of the housing 12 may include a weight 11 for stabilizing the position of the housing 12 and maintaining the bottom side 28 of the housing 12 which faces the bed of a body of water into which the pop fishing lure 10 is placed. A hook swivel 24, for attaching a second hook (not shown), may also extend from the bottom 28 of the housing 12 for catching a fish.

The interior of the housing 12 may include a first compartment 30 and a second compartment 32. There may be a plurality of air vent holes from each compartment 30, 32 to the exterior of the lure 10. Thus, for example, single vent 22 may extend from the top side 26. Another vent aperture 54 may extend from the second compartment 33 to the top side 26 of the lure 10, Only one vent 22, 54 is shown, one for each compartment 30, 32, respectively. It will be understood that any number of vents may be used.

A plurality of release apertures 38 may extend from the second compartment 32 and through the housing 12. In the example provided, there are shown six such release apertures 38, two 56 through the housing 12 and exiting the bottom 28 and two 58 adjacent the bottom vents 56 near the bottom 28 of the lure 10.

The first compartment 30 is located near the top side 26 of the housing 12. A fish attractant (not shown) may be received in the first compartment 30. Any well known liquid fish attractant may be used.

The top side 26 of the housing 12 may include at least one fill hole 34 for providing access to the first compartment 30. The fill hole 34 may be selectively plugged by any well known means such as a stopper 36 which may be tethered to the lure 10 as by stopper 36 having a boss 62 which is attached to the housing 12 at an engaging aperture or detent in the lure 10 as is well known. The stopper 36 may be made of rubber or another material that is flexible and forms a tight seal to thereby prevent the fish attractant from leaking out of the first compartment 30 via the fill hole 34.

The second compartment 32 may be located near the bottom side 28 of the housing 12 towards the rear end 16. A cylindrical extension 40 of the second compartment 32 may extend along the symmetrical longer side of the lure 10 (i.e., from the front 14 to the end 16). The second compartment 32 may include an angled base 64 which may be at 45° angle to facilitate the flow of fish attractant from the first compartment 30 and the cylindrical 50 of the second compartment 32 and into the larger portion 66 of the second compartment 32.

The first compartment 30 may envelope and wrap primarily around the cylindrical portion 40 of second compartment 32. The first compartment 30 may be continuous, or C-shaped, as shown hereinafter with respect to FIGS. 3A and 3B. The cylindrical extension 40 may be integrally formed and extend from the second part 66 of the second compartment 32. A further conduit portion 68 (FIG. 1, shown in phantom in FIG. 2) extends axially from and communicates through a wall 82 of the cylindrical chamber 40 and through the front 14 of the lure 10. A plurality of apertures 60 communicate between the cylindrical chamber 40 and the first compartment 30.

A piston 42 (FIG. 1) may comprise a piston rod 46 which is fixedly connected to a pistonhead 70. The piston rod 46 may be secured to the head 70 by any well known means, such as by being threaded into a matching threaded axial bore (not visible) in the head 70, or by the mating end of the rod 46 being secured by a nut on a portion of the rod which extends from the rear of the pistonhead 70 (not shown). The front end 72 (FIGS. 1 and 5) of the piston may terminate in an enlarged section 74. For example, the end may comprise two loops 76, 78 forming, as shown, a figure eight. The loop 76 intended to abut the front end 14 of the lure 10 may be larger than the forward loop 78 as will be discussed below. Resilient means, which may, for example, be a compression spring 44 may be disposed in the cylindrical portion 40 and about the piston rod 46. The spring 44 may be positioned about the piston rod 46 and between the pistonhead 70 and the wall 82 of the cylindrical extension 46. If the housing 12 is in two parts, along the length of the lure 10, then each half (only one half is shown in FIG. 1) may an L-shaped channel 84 may be formed or molded into each half of the top 26 of the housing 12. A mirror image L-shaped channel 86 may be formed in each of the bottom 28 of the housing 12. The forward pin 18 may be substantially U-shaped, having its opposed legs having a portion thereof L-shaped so as to conform to and be mated with the L shaped channels 84, 86.

Figure 3A:
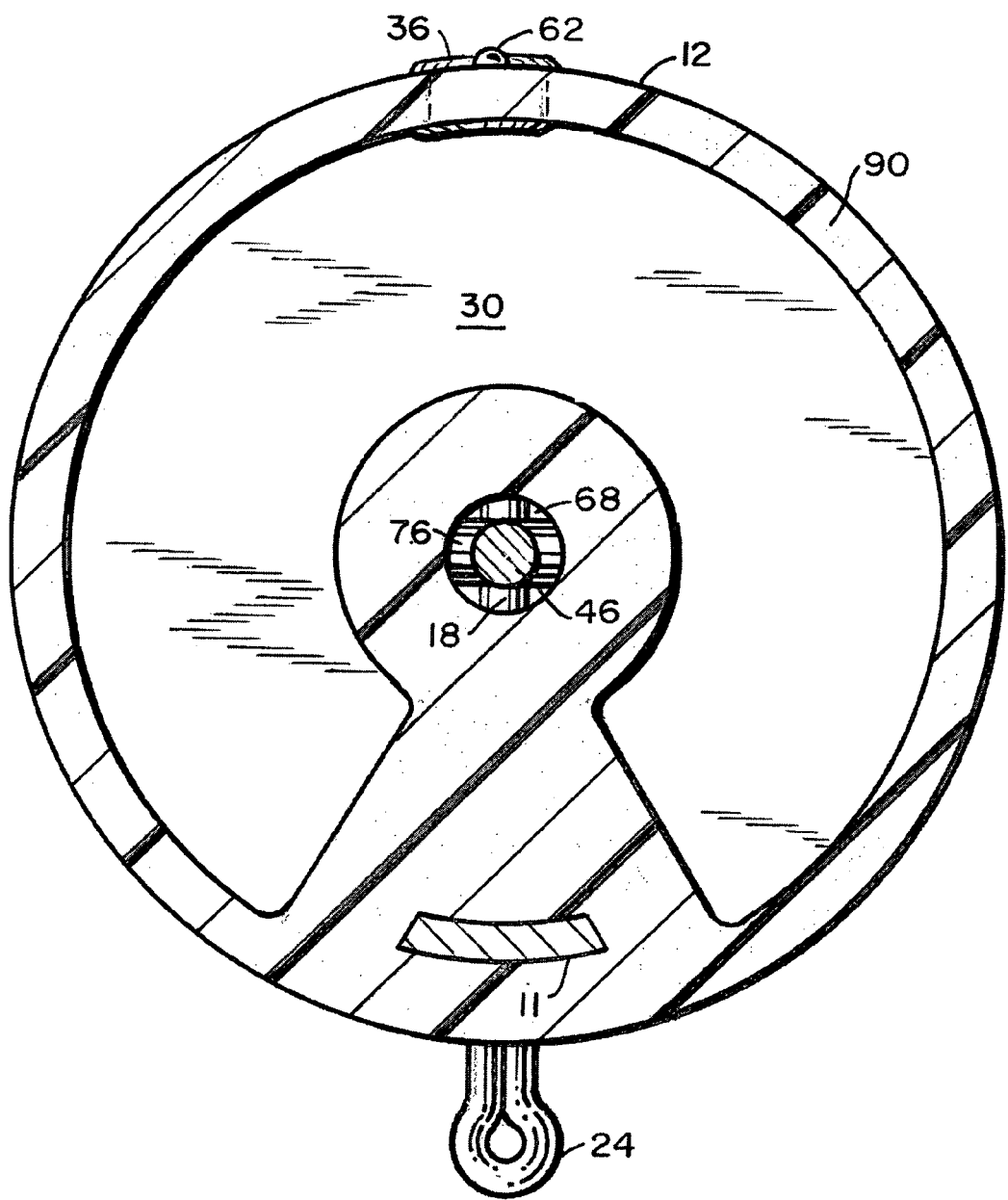
FIG. 3A is a cross-sectional view of the pop fishing lure taken along the line labeled 2A-2A in FIG. 1 and looking in the direction of the arrows.

FIG. 3A is a front cross-sectional view of the pop fishing lure 10 taken along line 2A-2A in FIG. 1 and looking in the direction of the arrows. The housing 12 is shown in two parts 88, 90 with the first compartment 30 and the conduit 68 of the second compartment 32.

Figure 3B:
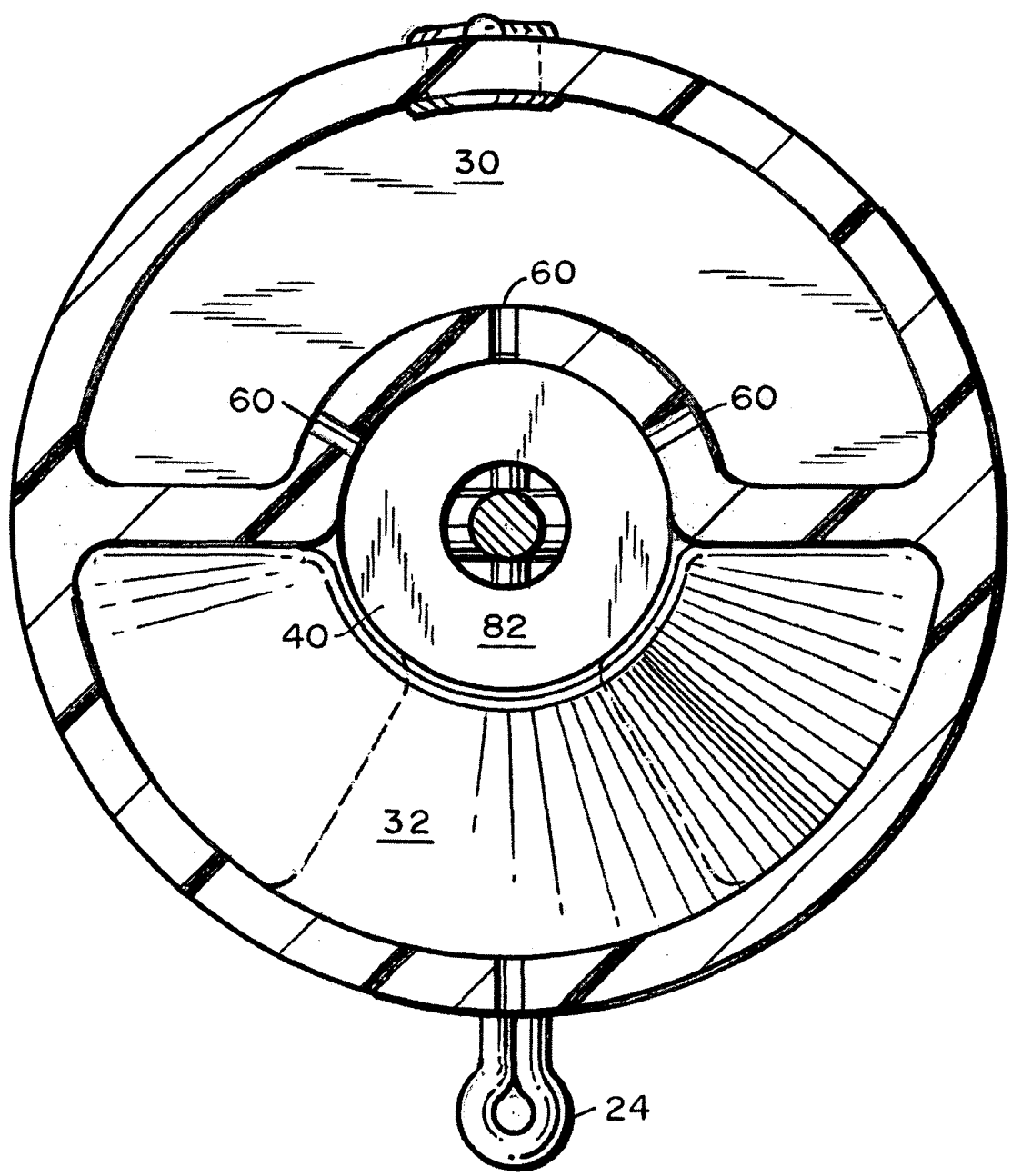
FIG. 3B is a cross-sectional view of the pop fishing lure taken along the line labeled 2B-2B in FIG. 1.

FIG. 3B is another cross-sectional view of the pop fishing lure 10 taken along line 2B-2B in FIG. 1 and looking in the direction of the arrows. The chamber 30 is shown as having a generally C-shape through the section. The chamber 30 as it extends from the rear to the front of the lure 10 gets ever larger in volume and wraps about the lower chamber 32 (shown in phantom) so that at the front, the upper chamber 30 forms a U-shape about the conduit 68 (not visible in FIG. 3B). The apertures 60 are shown in phantom.

In assembly, referring to a two part housing 12 as discussed above, the piston rod 46 is disposed in the conduit 68 and cylindrical extension 40. The spring 44 may be disposed about the piston rod 46, with one end engaging the wall 82. The pistonhead 70 may then be attached to the piston rod 46 as previously described so that the pistonhead 70 engages the end of the spring 44 opposed the spring end which engages the wall 82.

The forward pin 18 may be threaded or passed through the lower loop 76 at the end of the rod 46 and the legs of the pin 18 disposed in the L-shaped channels 84, 86. With the piston 42 in place, the two halves of the housing 12 are joined together by the screws 48 thereby holding in place the piston 42 and spring 44 as assembled. When assembled, the pistonhead 70 closes the apertures 60 between the first and second chambers. A fishing line 47 may be attached to the second loop 78 of the FIG. 8 end 72 of the piston rod 46.

In use, when the pop lure 10 is placed in or cast into the water, the user (not shown) pulls on the line 47. The force applied to the rod 46, by the pull on the line 47, causes the rod 46 to pull the piston 42 through the chamber 40 toward the wall 82, to thereby compress the spring 44. As the piston 42 moves along the chamber 40, the apertures 60 are opened and the fish attractant in the first compartment 30 flows into chamber 40 and thence into the second compartment 32. The fish attractant then flows from the second compartment 32 through the release apertures 38 and into the water for attracting fish to the lure 10. When the pulling force on the rod 46 is released, the spring 44 returns the pistonhead 42 to its at rest position and the apertures 60 are again closed. As the pistonhead 70 moves toward the rear of the lure 10, it pushes remaining attractant out of the cylindrical chamber and into the chamber portion 66 of the second chamber 32. The lower loop 76 of the rod 46 abuts the front end 14 of the lure housing 12 to thereby retain, with the pin 18, the piston 42 in position. As the line 47 is pulled, the front 14 of the lure 10 is raised and attractant in the portion of the upper chamber 30 which wraps about and is below the second chamber 32 is then in a relative position such that remaining attractant will flow from the front of the first chamber 30 to the rear where it will flow through apertures 60.

Figure 2:
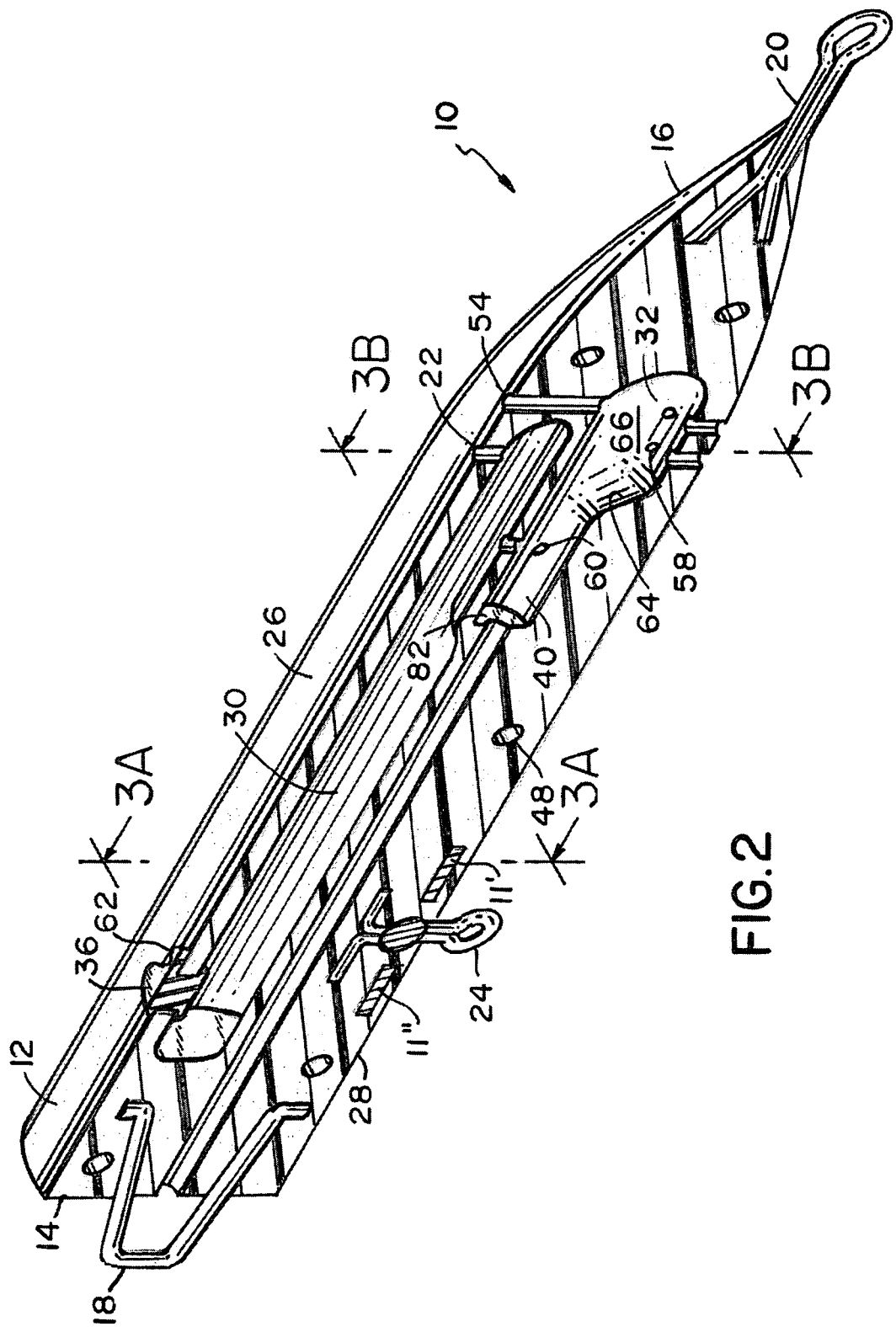
FIG. 2 is a perspective view of the a section of the lure of FIG. 1.

FIG. 2 shows the same construction of the lure 10 in FIG. 1 with one difference. The weight 11 in the base may be two weights 11' and 11" to provide additional ballast for the lure 10.

Figure 4:
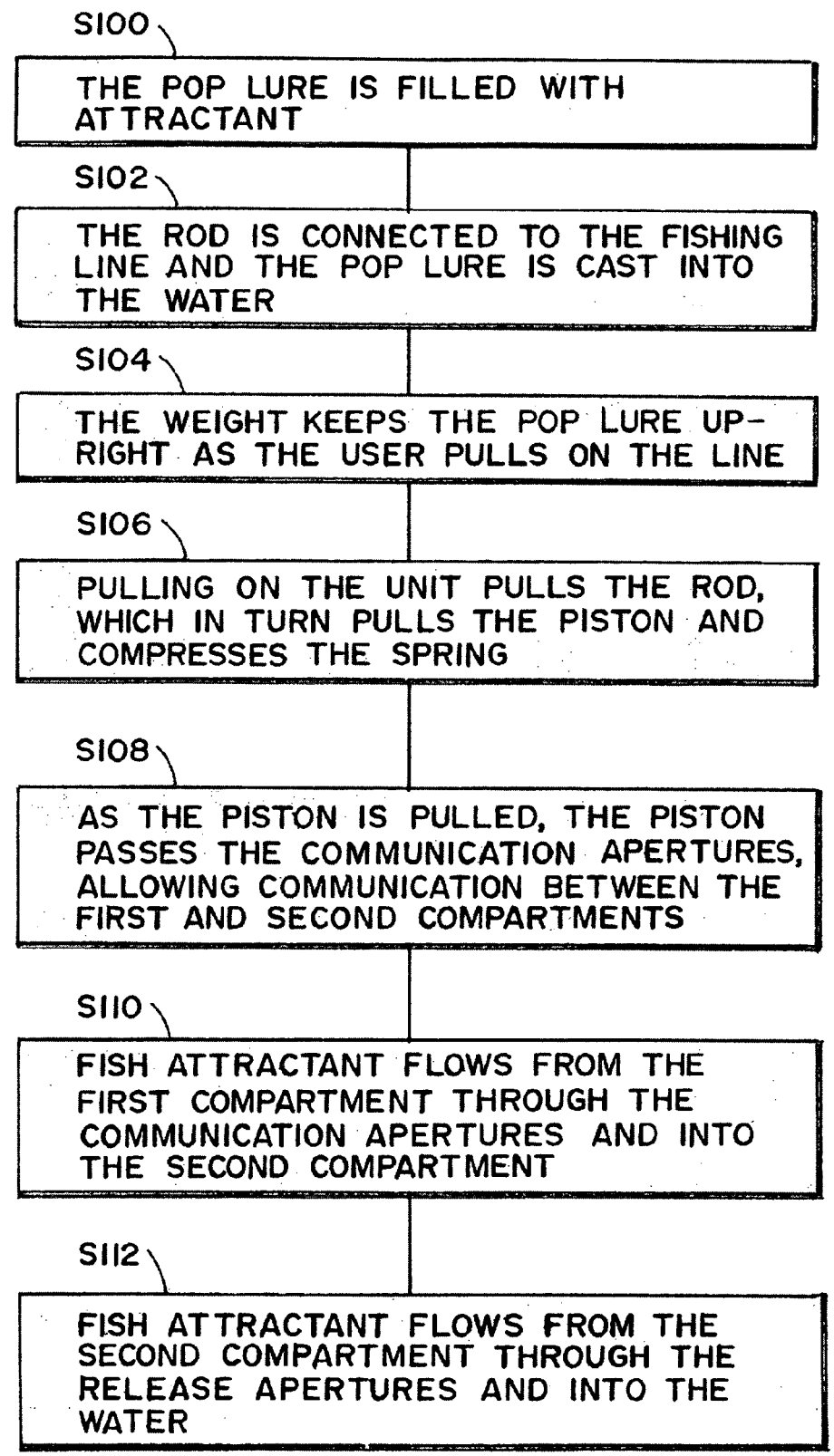
FIG. 4 is a flow diagram detailing the operation of the pop fishing lure.
Figure 5:
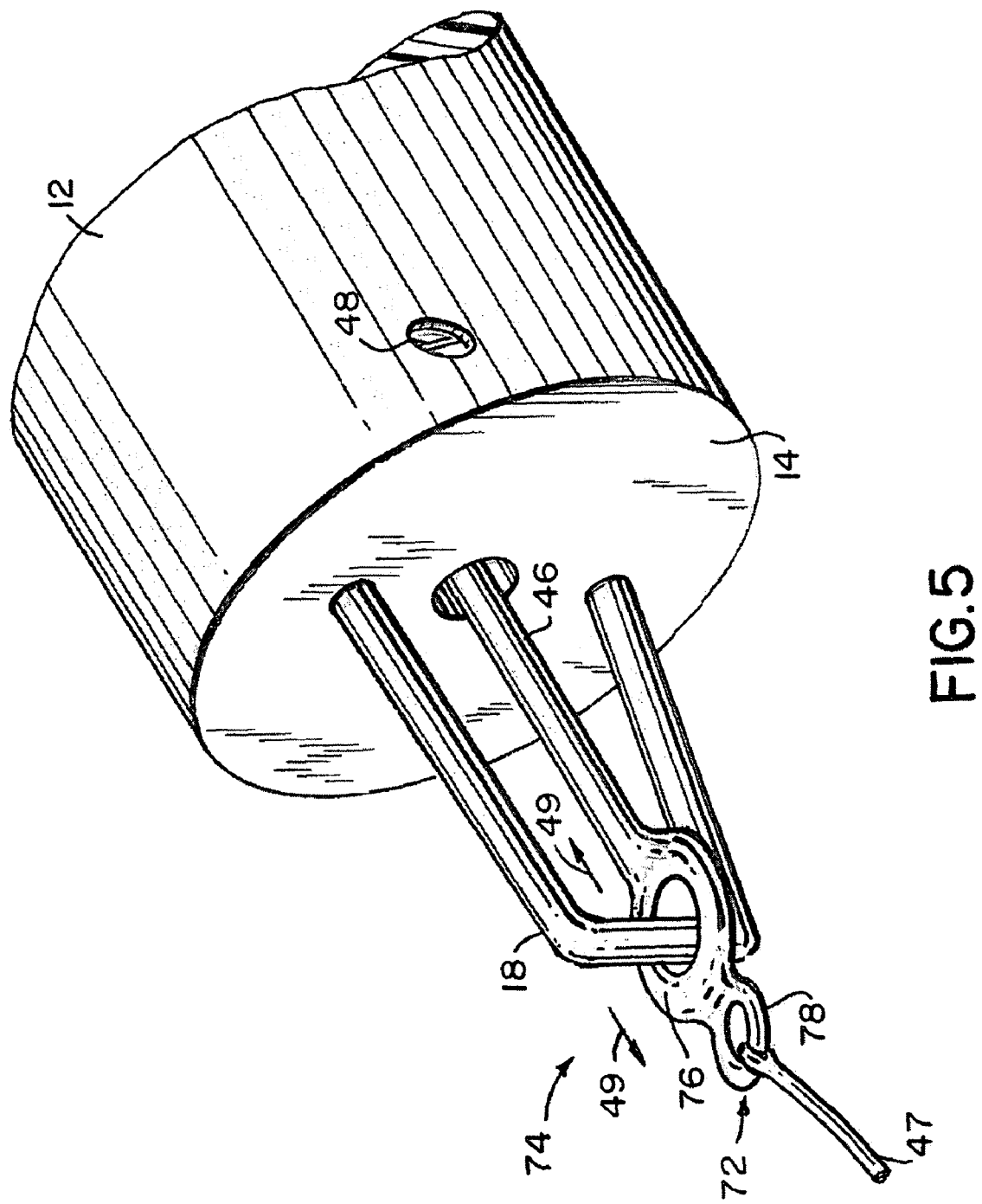
FIG. 5 is an enlarged view of the rod of the pop fishing lure shown in circle 7 in FIG. 1.

FIG. 4 shows a flow diagram which details the operation of the pop fishing lure 10. In step S100, the pop lure 10 is filled with fish attractant. In step S102, the rod 46 is connected to the fishing line 47 and the pop lure 10 is cast by the user into the water. The weight 11 (or 11', 11") in the pop lure 10 keeps the pop lure 10 upright as the user pulls on the line in step S104. In step S106, pulling on the line pulls the rod 46, which in turn pulls the pistonhead 70 and compresses the spring 44. As the pistonhead 70 is pulled, the pistonhead 70 uncovers the communication apertures 60, allowing communication between the first and second compartments 30, 32 in step S108. In step S110, fish attractant flows from the first compartment 30 through the communication apertures 60 into the second compartment 32. In step S112 fish attractant flows from the second compartment through the release apertures 38 and into the water.

It will be understood that each of the elements described above, or two or more together may also find a useful application in other types of devices differing from the type described above.

While certain novel features have been shown and described and are pointed out in the annexed claims, it is not intended to be limited to the details above, since it will be understood that various omissions, modifications, substitutions, and changes in the forms and details of the device illustrated and in its operation can be made by those skilled in the art without departing in any way from the spirit of the present device.

Without further analysis, others can, by applying current knowledge, readily adapt this device for various applications without omitting features that, from the standpoint of prior art, fairly constitute essential characteristics of the generic or specific aspects of this device.

What is claimed is:

1. A fishing lure for attracting fish of the type having secured thereto a fishing line in which the lure employs a fish attractant comprising:
   a housing having at least one volume therein for receiving the attractant;
   means within said housing for controllably releasing the attractant into the water,
   wherein said housing comprises at least first and second compartments,
   said first compartment storing the fish attractant therein;
   said second compartment for receiving the fish attractant from the first compartment, wherein said first compartment is substantially c-shaped in cross section and partially envelopes and communicates with said second compartment thereby enhancing the flow of the fish attractant.

2. The fishing lure of claim 1 wherein said second compartment is substantially jug shaped.

3. The fishing lure as recited in claim 2 further comprising at least one passageway connecting said first compartment to said second compartment; and
   said second compartment having at least one release aperture extending from said second compartment and through said housing.

4. The fishing lure as recited in claim 3 further comprises pistonhead means, moveable between a first position to a second position; in said first position said pistonhead means substantially restricting the flow of the fish attractant from said first compartment into said second compartment and, in said second position permitting said flow of the fish attractant from said first compartment into said second compartment.

5. The fishing lure as recited in claim 4 further comprises resilient means for urging said pistonhead from said second position to said first position.

6. The fishing lure as recited in claim 5 further comprising means for moving said pistonhead means into said second position to thereby engage said resilient means.

7. The fishing lure as recited in claim 6 wherein at least a part of said first compartment is above said second compartment so that the fish attractant flows from said first compartment into said second compartment.

8. The fishing lure as recited in claim 7 wherein said second compartment comprises an extended portion, said pistonhead means being movable within said extending portion between said first and second positions.

9. The fishing lure as recited in claim 8 wherein said extended portion comprises a generally cylindrical volume, said pistonhead means being slideable within said cylindrical portion between said first and second positions.

10. The fishing lure as recited in claim 9 further comprises means for communicating the force of the fishing line to said pistonhead means so as to move said pistonhead means between said first and second position.

11. The fishing lure of claim 10 wherein said pistonhead means comprises a pistonhead, said resilient means comprises a spring; and said means for communicating comprises piston rod means.

12. The fishing lure as recited in claim 11 wherein said pistonhead means comprise a pistonhead, said piston rod means comprises a piston rod, and said resilient means comprises a spring.

13. The fishing lure as recited in claim 12 wherein a first end of said piston rod is attachable to the fishing line.

14. The fishing lure as recited in claim 13 further including ballast means for positioning the device in the water.

15. The fishing lure as recited in claim 14 wherein said housing comprises a front and rear end, said second compartment having a conduit portion for communicating from said cylindrical portion to and without said front end, said cylindrical portion terminating in a wall through which entry is made into said conduit portion, and said spring residing between said pistonhead and said wall.

16. The fishing lure as recited in claim 15 further including at least one fill aperture extending from a top of said housing into said first compartment for selectively providing access to said first compartment for the fish attractant.

17. The fishing lure as recited in claim 16 wherein said housing comprising first and second sections, and connecting means for joining said two sections together.

18. The fishing lure as recited in claim 17 further comprise a major axis extending along the length of the device; said conduit and said cylindrical portion axes is aligned with said major axis.

19. A method for attracting a fish comprising the activities of:
   filling a first compartment of a lure with a fish attractant;
   connecting a fishing rod and reel with a line to the lure;
   casting the lure into a body of water;
   applying a force to the rod;
   said force working to open a passageway between the first compartment and a second compartment, allowing the fish attractant to flow from the first compartment to the second compartment; and
   releasing the attractant from the second compartment and into the body of water through at least one release aperture, wherein said first compartment is substantially c-shaped in cross section and partially envelopes said second compartment thereby enhancing the flow of the fish attractant.

20. The method as recited in claim 19 wherein in the activity of opening a passageway, providing a pistonhead, moving the pistonhead in the passageway between a first position which restricts communication between the first and second compartments and a second position which allows communication between the first and second compartments.

21. The method as recited in claim 20 further comprising attaching a hook to the lure.

22. The fishing lure as recited in claim 18 further comprises a stabilizing pin and one end of said piston rod comprises a figure eight configuration, and said stabilizing pin passes through one loop of said figure eight for limiting the movement of said piston rod from said second to said first positions.

* * * * *